United States Patent
Lucking et al.

(10) Patent No.: US 9,459,347 B2
(45) Date of Patent: Oct. 4, 2016

(54) ENVIRONMENT MONITORING SYSTEM FOR A VEHICLE

(75) Inventors: Christoph Lucking, Hannover (DE);
Rainer Risse, Pattensen-Reden (DE);
Udo Ronnenberg, Wedemark (DE);
Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 359 days.

(21) Appl. No.: 13/821,750

(22) PCT Filed: Jul. 30, 2011

(86) PCT No.: PCT/EP2011/003316
§ 371 (c)(1),
(2), (4) Date: Mar. 8, 2013

(87) PCT Pub. No.: WO2012/034612
PCT Pub. Date: Mar. 22, 2012

(65) Prior Publication Data
US 2013/0162461 A1    Jun. 27, 2013

(30) Foreign Application Priority Data
Sep. 17, 2010  (DE) .......................... 10 2010 045 657

(51) Int. Cl.
*G01S 13/93*    (2006.01)
*G01S 17/93*    (2006.01)
*G01S 15/87*    (2006.01)
*G01S 15/93*    (2006.01)

(52) U.S. Cl.
CPC ............ *G01S 13/931* (2013.01); *G01S 15/878* (2013.01); *G01S 15/931* (2013.01); *G01S 17/936* (2013.01); *G01S 2015/938* (2013.01)

(58) Field of Classification Search
CPC ..................... G01S 13/931; G01S 2013/9375; G01S 2013/9378; G01S 15/878; G01S 15/931
USPC ............................................ 342/70, 118, 146
See application file for complete search history.

(56) References Cited

U.S. PATENT DOCUMENTS

| 6,038,496 A | 3/2000 | Dobler et al. |
| 6,166,995 A | 12/2000 | Hoenes |

(Continued)

FOREIGN PATENT DOCUMENTS

| DE | 41 37 068 A1 | 6/1993 |
| DE | 195 07 957 C1 | 9/1996 |

(Continued)

*Primary Examiner* — John B Sotomayor
*Assistant Examiner* — Marcus Windrich
(74) *Attorney, Agent, or Firm* — Warner Norcross & Judd LLP

(57) ABSTRACT

An environment monitoring system for a vehicle includes at least two distance sensors for detecting distance by measuring the propagation time of detection signals. The distance sensors are each designed as a transmitting unit and receiving unit for the detection signals and, in a direct operating mode, emit detection signals, receive reflected components of the detection signals emitted by the distance sensors; and emit active measurement signals according thereto. The system also includes a control device that receives the measurement signals of the distance sensors and determines the object distance of a detected object. At least one distance sensor additionally can be operated in an indirect operating mode to detect a detection signal emitted by another distance sensor and reflected by the object and to generate an indirect measurement signal.

18 Claims, 3 Drawing Sheets

(56) References Cited

U.S. PATENT DOCUMENTS

| | | | |
|---|---|---|---|
| 6,396,435 B1 | 5/2002 | Fleischhauer et al. | |
| 6,727,844 B1* | 4/2004 | Zimmermann | B60R 21/013 342/118 |
| 6,862,527 B2* | 3/2005 | Okamura | G01S 7/412 340/435 |
| 6,975,265 B2 | 12/2005 | Schlick et al. | |
| 7,176,789 B2* | 2/2007 | Herder | G01S 7/527 340/435 |
| 7,724,180 B2* | 5/2010 | Yonak | G01S 13/931 342/70 |
| 8,310,376 B2 | 11/2012 | Frank et al. | |
| 8,386,160 B2* | 2/2013 | Tsunekawa | G08G 1/166 342/455 |
| 2004/0143381 A1 | 7/2004 | Regensburger et al. | |
| 2006/0017605 A1* | 1/2006 | Lovberg | G01K 7/226 342/22 |
| 2007/0152870 A1* | 7/2007 | Woodington | G01S 7/414 342/70 |
| 2009/0212993 A1* | 8/2009 | Tsunekawa | B60R 21/0134 342/71 |
| 2010/0097264 A1* | 4/2010 | Kawasaki | H01Q 1/42 342/70 |
| 2010/0103023 A1* | 4/2010 | Ogawa | G01S 7/023 342/59 |
| 2010/0169015 A1* | 7/2010 | Tsunekawa | G08G 1/166 701/300 |
| 2010/0245065 A1* | 9/2010 | Harada | G01S 7/529 340/435 |
| 2010/0332078 A1 | 12/2010 | Hering et al. | |
| 2011/0163909 A1* | 7/2011 | Jeong | G01S 13/4463 342/70 |
| 2011/0234449 A1* | 9/2011 | Haberland | G01S 13/343 342/70 |
| 2011/0291874 A1* | 12/2011 | De Mersseman | B60R 21/0134 342/70 |

FOREIGN PATENT DOCUMENTS

| | | |
|---|---|---|
| DE | 197 11 467 A1 | 10/1998 |
| DE | 197 44 185 A1 | 4/1999 |
| DE | 101 24 909 A1 | 12/2002 |
| DE | 102 51 357 A1 | 5/2004 |
| DE | 10 2005 044 500 A1 | 3/2007 |
| DE | 10 2006 002 232 B4 | 7/2007 |
| DE | 10 2007 042 220 A1 | 3/2009 |
| DE | 10 2007 052 977 A1 | 5/2009 |
| DE | 10 2008 007 667 A1 | 6/2009 |
| DE | 10 2008 009 651 A1 | 8/2009 |
| EP | 1 517 157 A1 | 3/2005 |
| WO | WO 92/01954 | 2/1992 |

\* cited by examiner

ENVIRONMENT MONITORING SYSTEM FOR A VEHICLE

FIELD OF THE INVENTION

The invention generally relates to an environment monitoring system and method for a vehicle.

BACKGROUND OF THE INVENTION

Environment monitoring systems on vehicles are used to determine objects in the vehicle environment. In the case of rear area monitoring systems, the intention is to determine, in particular, a possible collision with objects in the rear area (environment behind the vehicle) during reversing.

For this purpose, the environment monitoring systems have distance sensors. During propagation time measurements, a distance sensor emits a detection signal into the region to be monitored at an emission time. If an object is detected by the detection signal, the object reflects back the signal, with the result that the distance sensor can detect it at a receiving time. The propagation time of the detection signal can be determined as the difference between the receiving time and the emission time, with the result that the total distance, which represents twice the distance between the object and the sensor, can be determined using the signal speed. Such propagation time measurements are carried out, in particular, with ultrasonic sensors and RADAR sensors, to some extent even with light beams (LASER) as the detection signals. Direction-dependent or angle-resolved detection cannot be carried out with propagation time measurements for the time being.

DE 10 2007 052 977 A1, for example, proposes triangulation in which two ultrasonic sensors are arranged in a horizontal line in the bumper region of a vehicle and each separately carry out a propagation time measurement, with the result that two items of distance information are determined and can be used to determine the distance between the sensor and the vehicle or the environment monitoring system by means of triangulation, such a distance generally being determined as the minimum distance from the vehicle. DE 10 2006 002 232 B4 also proposes such triangulation for determining the position of an object by measuring two distances from two different positions.

During such triangulation processes, a triangle can thus be determined given the known sensor distance (distance between the sensors) and the separately determined individual distances between an object and each of two distance sensors, with the result that the distance between the object and the monitoring system is determined as the height in this triangle. DE 10 2007 042 220 A1 also proposes such triangulation using ultrasonic sensors. DE 41 37 068 A1 provides an integrated optical multiple distance sensor and proposes optical triangulation using position-sensitive diodes.

DE 195 07 957 C1 proposes triangulation using infrared LEDs, a road surface being scanned in order to detect a lane boundary. DE 102 51 357 A1 discloses a method for setting or switching off a travel direction indicator, in which lane and/or travel direction changes are determined from the environmental data; a distance measurement as a propagation time measurement using infrared sensors of a mono camera and using triangulation of a stereo camera is also described in addition to lane detection.

Such triangulation methods presuppose that each distance sensor detects the object to be determined at substantially the same location and a triangle is thus formed. However, such determination by means of triangulation may be more complex in the case of larger objects. Furthermore, one of the distance sensors may possibly also not detect a measurement signal if, for example, the object has oblique surfaces running in an unfavourable manner, since RADAR beams and also ultrasonic waves undergo directed reflection, with reflections on unfavourable oblique planes possibly not resulting in an echo at the distance sensor. The large number of distance sensors, usually six to eight distance sensors for a vehicle width of a commercial vehicle of 2.5 m, for example, which is generally required for conventional rear area monitoring systems is also disadvantageous.

SUMMARY OF THE INVENTION

Generally speaking, it is an object of the present invention to provide an improved environment monitoring system that makes it possible to reliably monitor the environment with relatively little effort.

According to an embodiment of the present invention, an indirect measurement is carried out in which a first distance sensor emits a detection signal and another distance sensor, without transmitting, detects the detection signal from the first distance sensor that is reflected by an object, that is, receives an indirect echo, in a passive operating mode.

The detection signal output by the first, transmitting distance sensor thus reaches the object over a first distance, is reflected at the object, and reaches the second distance sensor over a second distance. This indirect measurement therefore makes it possible, during propagation time determination, to determine total distances, which are the sum of the distances between the transmitting and receiving distance sensor and the object.

Conventional direct measurements, in which a distance sensor transmits and receives, are preferably combined with the inventive indirect measurements, thus forming a combined operating mode. With this combination, both distance sensors therefore receive, while only one transmits. A direct measurement for determining the first distance and the indirect measurement of the combined total distance, from which the other distance can be determined using the measured first distance, are therefore carried out.

Such combined operating modes can advantageously be alternately carried out, with the result that each distance sensor alternately transmits and the others receive.

Advantageously, indirect measurements can be carried out in addition to the direct measurements without relevant additional outlay on hardware; only additional software programming of the distance sensors is required to the effect that they can be operated in the passive receiving operating mode without their own transmission signal.

Moreover, the indirect measurement makes it possible to carry out triangulation even if one of the two sensors possibly does not receive a direct measurement, which may exist, for example, in the case of unfavorably running reflection surfaces of the object to be detected. In such cases, the distance between both distance sensors and the object and additionally also the lateral position of the object can nevertheless be determined as a result of the combined operating mode.

Furthermore, the indirect measurements can be carried out, in particular, in addition to the direct measurements in order to enable mutual plausibility checking or estimation of errors. This is already helpful when using only two distance sensors. In such a case, the distance sensors may be fitted, in particular, to the lateral regions of the vehicle rear and may have relatively wide emission angles, for example more than 60 degrees, preferably almost 90 degrees, in order to largely detect the rear area in each case, with the result that the overlapping region of the emission angles is large. The emission angles are directed inwards, in particular, with the result that they detect the entire rear area to the rear as the overlapping region.

The indirect measurement should, in principle, result in the same total distance as the sum of the individual distances for two distance sensors in both measuring directions, with the result that the two mutual, indirect measurements can also be used for verification.

According to embodiments of the invention, additional operating modes or detection methods may be carried out, in particular also for the case in which an object to be detected does not result in an echo in the two sensors. These additional detection methods may comprise in this case:

(i) a radius estimation if only a direct echo from an individual distance sensor has been received;

(ii) a combination of the direct echoes for conventional triangulation;

in the case of only indirect measurements, determination of the object distance on an ellipse (the formation of such an ellipse may, in principle, be sufficient to detect a minimum possible distance); or (iii) a back-up function or additive power function in which both or all distance sensors simultaneously transmit and receive, thus making it possible to superimpose all emitted detection signals in order to increase the total power. In this case, although the distance of the object can only be estimated, a wavefront, which comes relatively close to the horizontal line of the sensor system, already results when a plurality of distance sensors are used. The total power achieved thereby makes it possible to detect objects, which may not yet be possible by means of individual direct measurements.

The invention therefore provides a cost-effective system that, in addition to the known direct measurements and direct triangulation methods, enables additional operating modes and detection methods, which considerably improve the reliability and detection accuracy and the plausibility checking of measurement results without relevant additional outlay on hardware for this purpose.

The distance sensors can be synchronized for the indirect measurements by the common control device, which is also required anyway to determine data in the conventional triangulation methods. In this case, synchronization signals may be output via a suitable bus system or via a star connection; for example, a LIN bus may be provided between the distance sensors and the common control device. The control device may output the synchronization signals as bus commands, in which case all distance sensors are addressed, for example, and the statement of the respective transmitting distance sensor is contained as a parameter. The measurement signals are accordingly output by the distance sensors to the control device via the bus. With such a design, the additional outlay on software is relatively low.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in more detail below using exemplary embodiments on the basis of the accompanying drawings, in which.

DETAILED DESCRIPTION OF THE PREFERRED EMBODIMENTS

Figure 1:
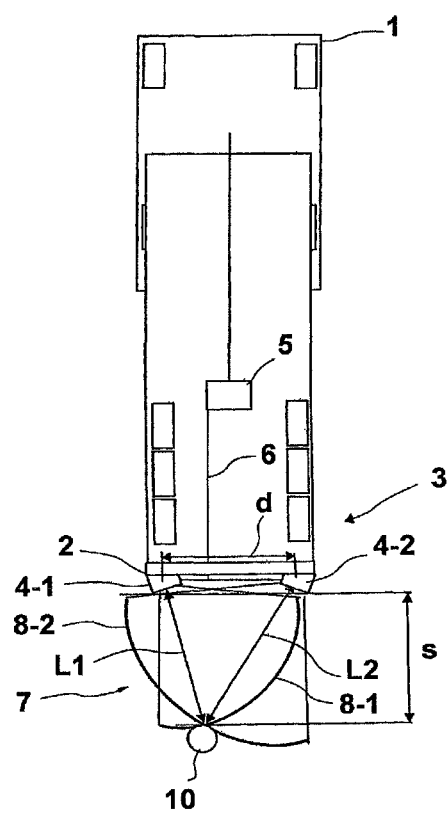
FIG. 1 shows a vehicle having an environment monitoring system according to a first embodiment of the invention with two distance sensors, and schematically illustrates the distance measurement.

A vehicle 1 may be in the form of a trailer vehicle or else an individual vehicle, for example. Fitted in or to its rear region 2 is a rear area monitoring system 3, which, in the embodiment according to FIG. 1, has two ultrasonic distance sensors 4-1, 4-2 and a control device 5 that are connected to one another via a LIN bus 6, with the result that the rear area monitoring system forms a bus system.

The two ultrasonic distance sensors 4-1 and 4-2 are arranged on the lateral outer regions of the rear region 2; according to the plan view in FIG. 1, the left-hand distance sensor 4-1 is thus arranged on the very left and the right-hand distance sensor 4-2 is arranged on the very right of the rear region 2 of the vehicle 1.

The ultrasonic distance sensors 4-1 and 4-2 have, for example in a manner known per se, a diaphragm, which is used both to transmit and to receive ultrasonic waves. Alternatively, however, the ultrasonic distance sensors 4-1 and 4-2 may also each have separate transmitting and receiving devices.

Figure 2:
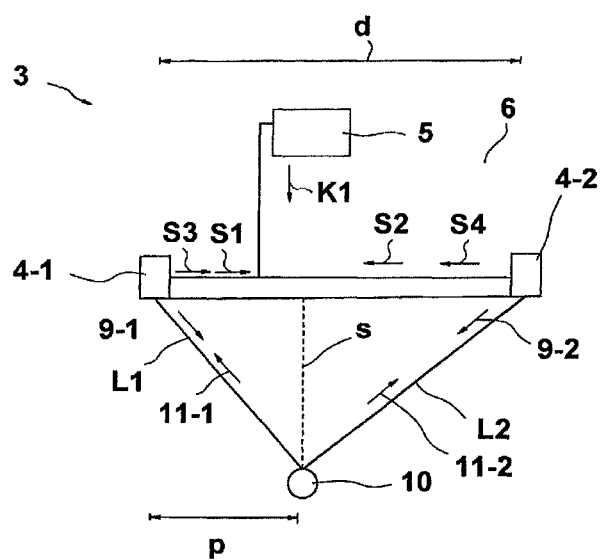
FIG. 2 is a schematic illustration of the measurement principle according to an embodiment of the invention.

FIG. 1 shows emission angle regions 8-1 and 8-2 of the distance sensors 4-1 and 4-2, which detect a rear area 7 behind the vehicle 1; these emission regions 8-1 and 8-2 may be emission cones, for example, but there is advantageously an emission characteristic substantially in a horizontal plane. In FIG. 2, the ultrasonic waves emitted by the first ultrasonic distance sensor 4-1 are denoted using 9-1, and the ultrasonic waves then reflected by an object 10 are denoted using 11-1. Accordingly, the ultrasonic waves emitted by the second ultrasonic distance sensor 4-2 into its emission region 8-2 are denoted 9-2, and the ultrasonic waves then reflected by the object 10 are denoted 11-2. The emission regions 8-1 and 8-2 are each directed rearwards and inwards, with the result that the emission regions 8-1 and 8-2 largely overlap. The detection regions of the ultrasonic distance sensors 4-1 and 4-2, within which they can receive reflected ultrasonic waves, are generally larger than their emission angle regions 8-1 and 8-2.

According to an embodiment of the present invention, a first, direct operating mode is possible, in which—in a manner known per se—each distance sensor 4-1 and 4-2 actively separately emits ultrasonic waves 9-1 and 9-2 and then detects its reflected ultrasonic waves. The first ultrasonic distance sensor 4-1 thus emits, in this first operating mode, ultrasonic waves 9-1, which are partially reflected by the object 10 as ultrasonic waves 11-1, and detects these reflected ultrasonic waves 11-1 after a time difference $\Delta T$. A distance LI between the object 10 and the first distance sensor 4-1 can then be detected according to the principle of propagation time measurement: the ultrasonic waves 9-1, 11-1 cover the distance 2×L1 at the speed of sound c, with the result that $$2 \times L1 = \Delta T \times c,$$

from which L1 can be determined. The distance sensor 4-1 passes a direct measurement signal S1 to the control device 5.

Accordingly, the second ultrasonic distance sensor 4-2 actively measures its distance L2 from the object 10 in the direct operating mode by means of a propagation time measurement and passes a direct measurement signal S2 to the control device 5.

Furthermore, the distance d between the distance sensors 4-1 and 4-2 is known, with the result that the triangle 4-1, 10, 4-2 is known completely with its sides L1, L2 and d, and an object distance s thus results as the height in this triangle, the height s being perpendicular to d. The object distance s is thus determined in the control device 5 by means of triangulation using the known triangle 4-1, 10, 4-2.

According to an embodiment of the present invention, a second, indirect operating mode is also possible, in which the distance sensors 4-1 and 4-2 receive reflected ultrasonic waves 11-2 and 11-1 emitted by the respective other distance sensor 4-2 or 4-1: the first distance sensor 4-1 thus emits ultrasonic waves 9-1 and the second distance sensor 4-2, without transmitting, passively detects the ultrasonic waves 11-1 reflected by the object 10. In this second operating mode, the ultrasonic waves have therefore covered the total distance L1+L2 from the first distance sensor 4-1, via the object 10, to the second distance sensor 4-2. Since the distance sensors 4-1 and 4-2 are synchronized, the time difference between the sending time in the first distance sensor 4-1 and the receiving time in the second distance sensor 4-2 can be determined as the propagation time and the total distance L1+L2 can accordingly be calculated using the speed of sound c.

Furthermore, conversely, the second distance sensor 4-2 may also actively emit ultrasonic waves 9-2 and the first distance sensor 4-1, without transmitting, can accordingly passively detect the second ultrasonic waves 11-2 reflected by the object 10, with the result that the same total distance L2+L1 can be determined by means of the propagation time measurement.

The direct and indirect operating modes are advantageously combined to the effect that one distance sensor, for example 4-1, transmits and itself firstly receives in the direct operating mode and the other distance sensor 4-2 passively receives. The distances L1 and L1+L2 can therefore be simultaneously determined in this combined operating mode.

The second distance sensor 4-2 then transmits and receives in its direct operating mode, while the first distance sensor 4-1 only passively receives, with the result that the distances L2 and L2+L1 can then be simultaneously measured.

The distance sensors 4-1 and 4-2 pass indirect measurement signals S3 and S4 to the control device 5. In this combined operating mode, both distances can already be determined from the two measurement signals from each measurement. In the first measurement in which the first distance sensor 4-1 actively transmits and receives and the second distance sensor 4-2 only passively receives, the distance L1 can thus be directly determined from the active measurement signal S1 from the first distance sensor 4-1 by halving, and this value can be subtracted from the total distance L1+L2 transmitted as the passive measurement signal S4 from the other distance sensor 4-2:

a. The distance sensor 4-1 transmits and both distance sensors 4-1 and 4-2 receive—the first distance sensor therefore measures the distance D1=L1+L1 and the second distance sensor 4-2 measures the distance D2=L1+L2;

b. L1 is calculated from D1 by halving; and c. L2 is calculated from D2 and the L1 determined in step 2 by subtraction.

The triangle 4-1, 10, 4-2 is therefore known, with the result that its height (height of the object 10 on the side d) can be determined as the object distance s between the object 10 and the sensors 4-1, 4-2 or the vehicle 1. According to FIG. 2, the lateral position p of the object 10 can then be determined, for example, according to FIG. 2, as the section p between the height projection of the object 10 along the height s and the first distance sensor 4-1, where $p^2+S^2=L1^2$. The position of the object 10 with respect to the two distance sensors 4-1 and 4-2 and also with respect to the vehicle rear 2 (with the known position of the distance sensors 4-1, 4-2 on the vehicle rear 2) is thus known.

Figure 3:
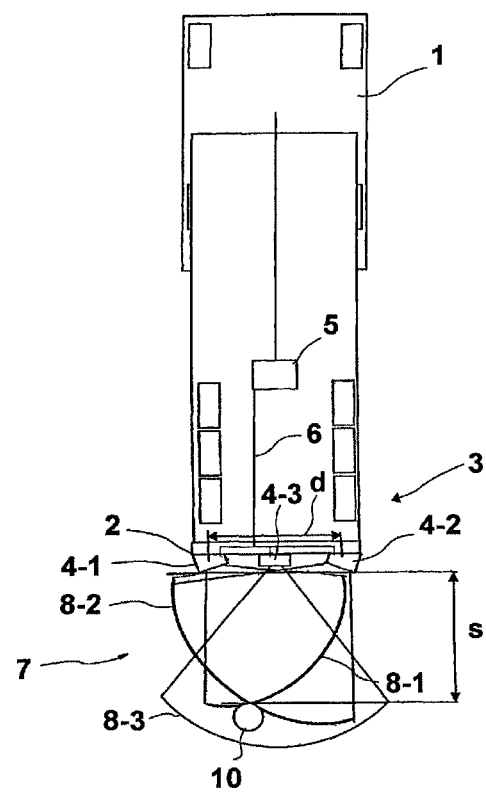
FIG. 3 shows an alternative embodiment to FIG. 1 with three distance sensors.

FIG. 3 shows another embodiment in which, in comparison with the embodiment depicted in FIG. 1, the third, middle ultrasonic distance sensor 4-3 is additionally provided. In this embodiment, the emission angle regions (emission lobes) 8-1 and 8-2 of the two outer ultrasonic distance sensors 4-1 and 4-2 may possibly be rotated somewhat outwards since the middle region is detected by the distance sensor 4-3, which is additionally provided. A lateral rear region can therefore also be additionally detected here.

In the embodiment shown in FIG. 3, three direct distance measurements can be carried out. Indirect measurements are also possible, one of the distance sensors 4-1, 4-3, 4-2 alternately transmitting in each case and all three distance sensors 4-1, 4-2, 4-3 receiving, thus resulting in six indirect measurements and the distances L1+L2, L1+L3, L2+L3 each in turn being measured twice (in both directions).

A more comprehensive system of equations for determining the object distance s and the lateral width p can therefore be formulated in this embodiment.

In all embodiments, the object 10 may also be situated beside the vehicle 1. This lateral position of the object 10 can be detected, the distance p being negative or greater than d in this case. Such objects can be directly rejected or indicated as being unobstructive by the algorithm.

In principle, an object 10 may not completely or symmetrically reflect ultrasonic waves 8-1 or 8-2 in all directions, for example on account of its material properties or the inclination of its surfaces. In FIG. 1 for example, the object 10 may not result in an echo in the two distance sensors 4-1 and 4-2. If, for example, the first distance sensor 4-1 transmits, the second distance sensor 4-2 may possibly not receive an echo or any reflected ultrasonic waves 11-1 or, conversely, only the second distance sensor 4-2 may receive reflected ultrasonic waves 11-1, but not the transmitting distance sensor 4-1 itself. In this last case in particular, it may not be possible at all to detect a signal in the conventional first operating mode. According to embodiments of the invention, additional detection methods may be carried out in such cases and in other cases. These are, for example:

1. a radius estimation if only a direct echo has been received, that is, over the distance L1+L1 or the distance L2+L2 (the radius of the distance circle or of the distance sphere with respect to the distance sensor that receives the direct echo is therefore known);

2. triangulation of direct measurements if no indirect echoes have been received (the distances L+L and L2+L2 are therefore measured, but no cross terms; in this case, conventional triangulation from the individually measured distances L1 and L2 and the known sensor distance d is possible);

3. determination of the object distance s on an ellipse if only indirect measurements are possible (the indirect measurements provide the sum L1+L2 of the two distances L1 and L2; all points with this constant sum are on an ellipse, at the focal points of which the distance sensors 4-1 and 4-2 lie—such formation of an ellipse may, in principle, be sufficient to detect a minimum possible distance); or 4. as back-up: both distance sensors 4-1 and 4-2 transmit and receive at the same time in order to increase the emitted total signal power. It is thus possible to achieve a total power, which is formed as the superimposition of the emission angle regions (emission cones) 8-1 and 8-2 (the emission angle regions 8-1, 8-2, 8-3 in FIG. 3). This superimposition more strongly assumes the shape of a parallel wavefront towards larger object distances s. In this mode, the object distance s can only be estimated; however, with larger object distances s in particular, the measurement accuracy is no longer so relevant on account of the unknown lateral position, in particular if s becomes very large with respect to d. Estimations of larger object distances s are therefore also possible.

The distance sensors 4-1 and 4-2 are advantageously synchronized via the control device 5, which outputs corresponding control signals or commands via the LIN bus 6. The control device 5 can thus output synchronization commands K1 to all distance sensors 4-1 and 4-2 in FIG. 1 and 4-1, 4-2 and 4-3 in FIG. 3 via the bus 6, that is, all sensors are addressed, the synchronization command K1 respectively containing a parameter for defining the transmitting distance sensor, and all distance sensors receiving, whereupon they output measurement signals S1 and S4 or S2 and S3 to the control device 5.

According to the invention, measurements in different planes and measurements across different planes are also possible.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. An environment monitoring system for a vehicle, the monitoring system comprising:
at least two distance sensors configured to: (i) output detection signals and receive reflected components of the detection signals, and (ii) detect distances to an object by measuring a propagation time of the detection signals, wherein, in a triangulation mode of the monitoring system, the at least two distance sensors are simultaneously operated in a direct operating mode such that each of the at least two sensors generates an active measurement signal based on propagation time of a detection signal output by that distance sensor and a reflected component thereof, and wherein, in a combined operating mode of the monitoring system, one of the at least two distance sensors is operated in the direct operating mode and each of the others of the at least two distance sensors is operated in an indirect operating mode to passively receive a reflected component of a detection signal output by the one distance sensor of the at least two distance sensors operable in the direct operating mode and reflected by the detected object, and to generate an indirect measurement signal based thereon; and
a control device configured to receive the active and indirect measurement signals from the at least two distance sensors and to determine an object distance of the detected object.

2. The monitoring system according to claim 1, wherein the system is a rear area monitoring system arranged in a rear region of the vehicle to determine the object distance of the detected object when the detected object is located in a rear area behind the vehicle.

3. The monitoring system according to claim 1, wherein the detection signals are one of ultrasonic waves and radar waves and light beams output by the at least two distance sensors into emission angle regions.

4. The monitoring system according to claim 3, wherein the emission angle regions of the at least two distance sensors are directed rearwards and towards one another so as to at least largely overlap in a rear area behind the vehicle.

5. The monitoring system according to claim 3, wherein the emission angle regions of the at least two distance sensors are substantially in a horizontal plane and detect an angle range of greater than about 45 degrees.

6. The monitoring system according to claim 1, wherein each of the at least two distance sensors is operable in:
a) the direct operating mode to determine a distance between that distance sensor and the object as half the distance covered by a detection signal output by that distance sensor in a detection time between an emission time of that detection signal and a receiving time of a reflected component thereof, and
b) the indirect operating mode to determine in an indirect measurement a sum of a distance between that distance sensor and the object and a distance between a transmitting one of the at least two distance sensors and the object, that distance sensor and the transmitting distance sensor being synchronized when that distance sensor is in the indirect operating mode such that an emission time of a detection signal output by the transmitting distance sensor and a receiving time of a reflected component thereof is aligned, the distance between that distance sensor and the object being determinable by the control device by subtracting the distance between the transmitting distance sensor and the object, determined in an active measurement signal generated by the transmitting distance sensor, from the sum determined in the indirect measurement.

7. The monitoring system according to claim 1, wherein, in the combined operating mode, each of the other distance sensors is restricted from transmitting detection signals.

8. The monitoring system according to claim 1, wherein, in the combined operating mode, the at least two distance sensors are configured to alternate their operating modes, such that different ones of the at least two distance sensors are operable in the direct operating mode.

9. The monitoring system according to claim 1, wherein the at least two distance sensors are operable in at least one of the following further operating modes:
a) a radius estimation mode when only a single one of the at least two distance sensors receives a reflected detection signal in a direct measurement;

b) a back-up operating mode in which some or all of the at least two distance sensors substantially simultaneously transmit and receive to increase emitted total signal power and to estimate the object distance; and c) an exclusively indirect measurement mode when there are only indirect measurements by determining the object distance on an ellipse that forms a set of all points with the same sum of distances to the at least two distance sensors.

10. The monitoring system according to claim 1, wherein the control device is configured to output synchronization signals to all of the at least two distance sensors to synchronize the at least two distance sensors.

11. The monitoring system according to claim 1, wherein the control device is connected to the at least two distance sensors via a bus, and is configured to output synchronization signals for the combined operating mode, the synchronization signals being addressed to all of the at least two distance sensors and containing, as a parameter, a statement as to which of the at least two distance sensors is to be the one distance sensor that operates in the direct operating mode.

12. The monitoring system according to claim 1, wherein the at least two distance sensors comprise two distance sensors disposed at left-hand and right-hand lateral rear regions of the vehicle.

13. The monitoring system according to claim 1, wherein the at least two distance sensors comprise three distance sensors, one of which is disposed at a left-hand lateral rear region of the vehicle, one of which is disposed at a right-hand lateral rear region of the vehicle, and one of which is disposed at a middle rear region of the vehicle.

14. The monitoring system according to claim 1, wherein the at least two distance sensors are in a plurality of planes positioned above one another.

15. A method for determining distance to an object using an environment monitoring system, the environment monitoring system comprising a control device and at least two distance sensors configured to (i) output detection signals and receive reflected components thereof and (ii) detect distances to an object by measuring a propagation time of the detection signals, the method comprising:

in a triangulation mode of the monitoring system:
controlling the at least two distance sensors to simultaneously operates in a direct operating mode such that each of the at least two sensors generates an active measurement signal based on propagation time of a detection signal output by that distance sensor and a reflected component thereof; and
determining, using the control device, an object distance of the detected object based on the active measurement signals; and in a combined operating mode of the monitoring system:
controlling the at least two distance sensors such that one of the at least two distance sensors operates in the direct operating mode and each of the others of the at least two distance sensors operates in an indirect operating mode to passively receive a reflected component of a detection signal output by the one distance sensor of the at least two distance sensors operating in the direct operating mode and reflected by the detected object, and to generate an indirect measurement signal based thereon; and
determining, using the control device, an object distance of the detected object based on an active measurement signal generated by the one distance sensor of the at least two distance sensors and the indirect measurement signal generated by each of the other distance sensors of the at least two distance sensors.

16. The monitoring system according to claim 11, wherein the bus is a LIN bus.

17. The monitoring system according to claim 1, wherein the control device is configured, in the triangulation operating mode, to determine the object distance based on a known distance between the at least two distance sensors.

18. The monitoring system according to claim 1, wherein the control device is further configured to change the operating mode from the combined operating mode to the triangulation operating mode, when no indirect measurement signals are received in the combined operating mode.

* * * * *